United States Patent

Meier

[11] Patent Number: 6,041,944
[45] Date of Patent: Mar. 28, 2000

[54] SPIRAL MULTIPLE-TUBE FILTER

[75] Inventor: Hans-Peter Meier, Jona, Switzerland

[73] Assignee: Mavag Verfahrenstecnik AG, Altendorf, Switzerland

[21] Appl. No.: 09/011,161

[22] PCT Filed: Jul. 20, 1996

[86] PCT No.: PCT/EP96/03214

§ 371 Date: Sep. 14, 1998

§ 102(e) Date: Sep. 14, 1998

[87] PCT Pub. No.: WO97/04850

PCT Pub. Date: Feb. 13, 1997

[30] Foreign Application Priority Data

Aug. 2, 1995 [DE] Germany ............... 195 28 360

[51] Int. Cl.[7] ............... B01D 29/17; B01D 29/52; B01D 29/70
[52] U.S. Cl. ............... 210/356; 210/323.2; 210/333.01; 210/458; 210/497.01; 210/497.1; 210/489
[58] Field of Search ............... 210/356, 458, 210/497.1, 497.01, 489, 333.01, 323.2

[56] References Cited

U.S. PATENT DOCUMENTS

| | | |
|---|---|---|
| 2,826,308 | 3/1958 | Koupal . |
| 3,028,971 | 4/1962 | Peterson . |
| 3,233,739 | 2/1966 | Zievers . |
| 3,244,286 | 4/1966 | Schmidt . |
| 3,438,502 | 4/1969 | Schmidt . |
| 4,443,346 | 4/1984 | Muller . |
| 4,473,472 | 9/1984 | Muller . |

FOREIGN PATENT DOCUMENTS 1 536 928  2/1970  Germany .

*Primary Examiner*—Thomas M. Lithgow
*Attorney, Agent, or Firm*—Michael J. Striker

[57] ABSTRACT

A multiple tube filter made of at least one perforated filter element (15), wherein the outside of the filter element (15) has spirally circulating grooves (2), and the surface between grooves (2) is preferably arched outward in the form of a segment of a circle.

4 Claims, 2 Drawing Sheets

SPIRAL MULTIPLE-TUBE FILTER

BACKGROUND OF THE INVENTION

The invention relates to a multiple tube filter, consisting of at least one perforated filter element, wherein the outside of the filter element has spirally circulating grooves.

DE-OS 15 36 928 discloses a filter cartridge, as well as a filter element for use in this filter cartridge. The filter cartridge consists of a support sleeve made of plastic, which has been pushed into a tube-shaped filter sleeve of a felt material and is tightly enclosed by it. The support sleeve is perforated for the filtrate to run off. In one embodiment the support sleeve has a net-like appearance. To this end, two groups of rods bent into a spiral shape are arranged in such a way that their rises respectively extend in opposite directions. The rods are respectively connected with each other at their intersection points, which results in a net-like structure. The support sleeve is inserted into a tube-shaped filter sleeve of non-self-supporting needled felt, wherein the needled felt has such a high degree of inherent stiffness that the filter sleeve has a rigidity which is sufficient for maintaining its shape.

It is disadvantageous in respect to such a filter sleeve that a filter cake built upon the filter sleeve is not supported. There is therefore the danger that in the dried, shrunk state the filter cake collapses on itself. Then the flushing of the filter cake is only possible in a limited way, since the flushing liquid mainly runs off in the uncovered areas of the filter, while there is no flow through the filter cake, which lies in the lower area of the filter.

SUMMARY OF THE INVENTION

Based on DE-OS 15 36 928, it is therefore the object of the invention to make available a filter element for a multiple tube filter in which the filter cake is sufficiently stabilized, even in a dried and shrunk state, so that subsequent flushing with a solvent can be performed without problems.

This object is attained in that in a plane imagined perpendicularly in relation to the grooves the profile of the surface is arched outward in the shape of a segment of a circle between the grooves.

The surface with which the filter cake adheres to the filter element is advantageously increased by this, furthermore, the filter cake is additionally supported opposite the direction of gravity. The filter cake is sufficiently supported even after drying, i.e. after the appearance of cracks in the filter cake, and therefore cannot collapse on itself. It is therefore possible to perform flushing after drying without problems.

The production of the filter element becomes more cost-effective in that the exterior of the filter element consists of a partial surface of at least one spirally formed tube. Methods are available for the cost-effective production of tubes, which thus can be used for producing the filter element.

If a central shaft is embodied as a linear central tube, the structure of the filter element is additionally stabilized. Caps can be respectively placed on the ends of the central tube, which close off the filter element at the top and the bottom. During operation, the central tube absorbs the forces resulting from the pressure difference.

A good support of the filter cake is obtained, if the spirally circulating groove has a rise between 5° and 60°, the best support is achieved, if the spirally circulating groove has a rise of 30°.

The production of the filter element can be further simplified, if the outsides of the tubes are connected with each other. In this way it is possible to produce a tube bundle as a connected part on one work step, for example by extrusion.

The filter element is given a particularly high resistance to aggressive chemicals, if the filter element is made of a polymeric plastic material, preferably polyvinyl difluoride or polypropylene.

The production of the filter element is further simplified, if several tubes are combined into a tube bundle, and the tube bundle is preferably constructed of tubes with the same diameter.

The filter element becomes particularly stable in that the tube bundle is constructed of six tubes. Made from six tubes, the bundle can be combined with the tightest packing of the individual tubes.

The bundle becomes particularly stable, if it is constructed of six tubes and a central tube.

The run-off of the filtrate is further improved in that the filter element has ribs on its exterior. Additional channels are created by these ribs, through which the filtrate can run off.

Casting off the filter cake is simplified in that the exterior of the filter element is covered with a hose-like, preferably elastic filter fabric. The filter fabric is expanded when the filter element is back-flushed. The filter cake is cast off by means of this movement. If the filter fabric is elastic, it is smoothed against the filter element without the creation of wrinkles.

The invention will be described by means of a preferred embodiment, making reference to the drawings, wherein further advantageous details can be taken from the drawing figures. In this case functionally equivalent elements are provided with the same reference numerals.

DESCRIPTION OF PREFERRED EMBODIMENTS

Figure 1:
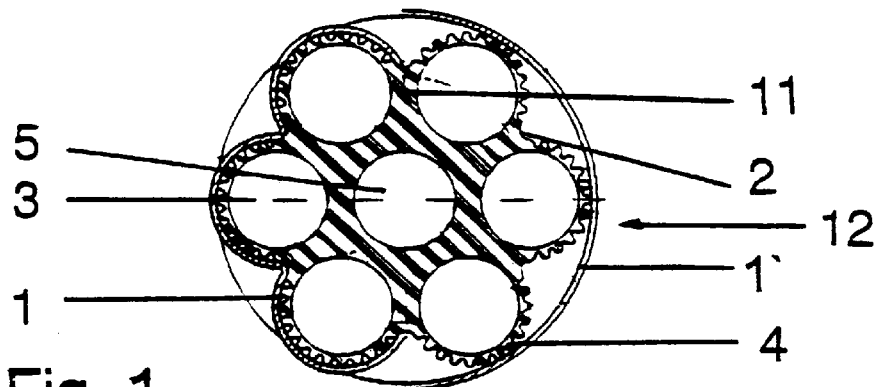
FIG. 1, a cross section along the section line I—I in FIG. 2 through a filter element, embodied as a one-piece element, for multiple tube filters, FIG. 2, a lateral view of a filter element for multiple tube filters. For a clearer view, the filter fabric has been removed from the front of the filter element, FIG. 3, a cross section along the section line III—III in FIG. 4 through a filter element, constructed as a component from six tubes and a central tube, for multiple tube filters, FIG. 4, a lateral view of a filter element for multiple tube filters. For a clearer view, the filter fabric has been removed from the front of the filter element.

In FIG. 1 a tube is identified by 12, which is composed of an extrudable material 11 and in its interior has seven channels 3, 5 of circular cross section. Here, six wound channels 3 are arranged in the tightest sphere packing around a central channel 5. The tube 12 has spirally extending grooves 2 on its exterior, the perforated outside surface 14 of which is arched toward the exterior in a manner of a segment of a circle between the grooves. These outside surfaces 14, arched in the form of a circle toward the exterior, have ribs 4, each of which extends parallel with the grooves 2 along the outside. The exterior of the tube is covered with a hose-like filter fabric 1. Here, 1 identifies the state during filtration, in this case the liquid flows from the exterior of the tube 12 into the channels 3. The state of the filter fabric during back-flushing is identified by 1'. The liquid flowing though the channels 3 toward the exterior lifts the filter fabric 1' up, and the filter cake is cast off.

Figure 2:
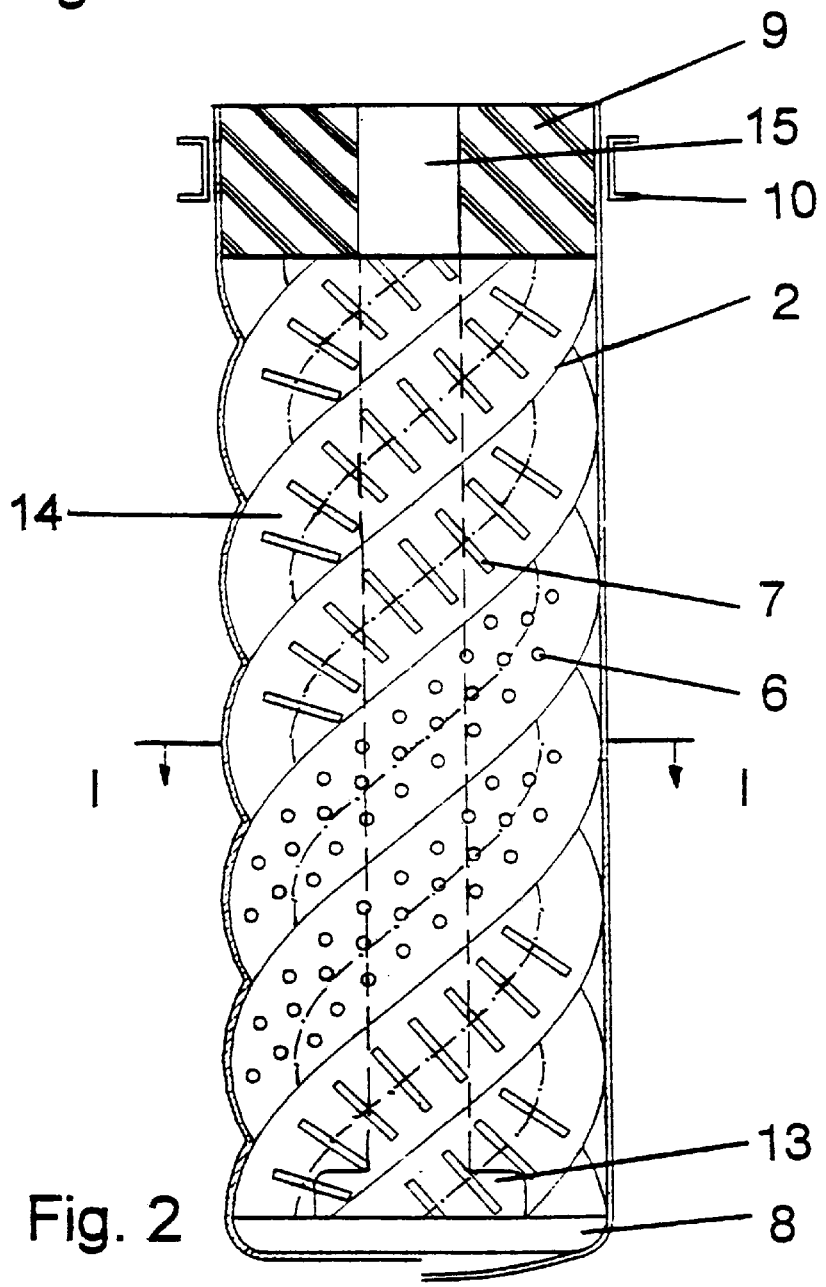

Caps, which border the filter element respectively at the bottom and the top are identified by 8 and 9 in FIG. 2. The cap 9 has an opening 15, through which filtrate is removed from the central tube 5 to the exterior. The central channel 5 is widened into a cup-shaped hollow space 13 at its lower end, into which the channels 3 also terminate. The helically bent channels 3 have openings 6, 7 for the run-off of the filtrate which, depending on their use, can be circular 6 or slit-shaped 7. The outside of the tube is covered by a filter fabric 1, wherein the position 1 shows the state of the filter fabric during filtration and the position 1' the state during back-flushing. The filter fabric is fastened to the cap 9 by means of a cuff 10. During filtration, the filtrate flows off through the openings 6, 7 into the channels 3, in the process building up a filter cake on the exterior of the filter element. From there it is collected by means of the hollow space 13 in the central channel 5 and removed from the filter element via the opening 15. The flow direction is reversed for back-flushing, because of the fluid flowing out of the filter element the filter fabric is expanded and is loosened from the outside surface 14 of the filter element. In the course of this movement, the filter cake is cast off the outside surface of the filter element.

Figures 3, 4:
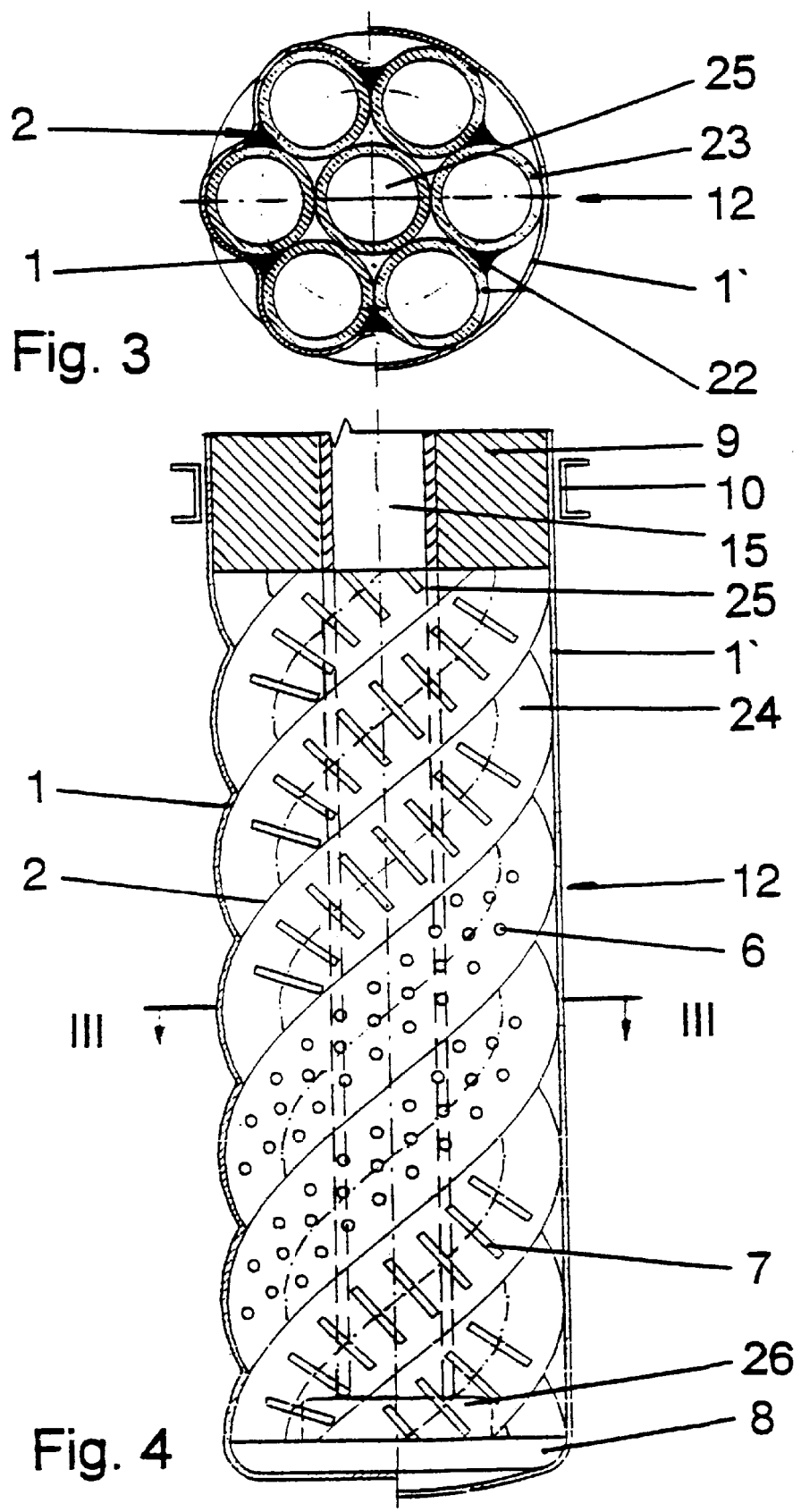

FIG. 3 shows a filter element constructed as a bundle of tubes made of seven individual tubes. Here, six helically wound tubes 23 are wound in the tightest packing around a central tube 25. The respectively outer wall of the tubes touch, and grooves 2 are formed on the surface of the filter element, which extend spirally along the outer surface 24 of the filter element. The tubes 23 are connected with each other at the contact points by a welded, fused or adhesive connection 22. The outer surface of the pipe bundle is covered with a hose-like filter fabric 1. The state during filtration is represented by 1, wherein the filter cake is collected in the grooves 2. The position of the filter fabric during the back-flushing process is identified by 1', it is then lifted off to the greatest extent from the outer surface 24 of the bundle of tubes.

FIG. 4 shows the position of the linear central tube 25. It is conducted from the bundle formed by the tubes 23 through the cap 9. At the opposite end it extends as far as the cup-shaped hollow space 26, which is bordered by the cap 8. The tubes 23 are spirally arranged around the central tube 25 and terminate in the cup-shaped hollow space 26. The grooves 22 spirally extend along the surface 24 between the tubes 23. The tubes 23 have openings 6, 7, which can be embodied to be either circular 6 or slit-shaped 7. The filter element is covered by a filter fabric 1, which is fastened to the cap 9 by means of a cuff 10. The state of the filter fabric during filtration is indicated by the position 1. It lies tightly against the surface 24 of the filter element. The position of the filter element during back-flushing is indicated by position 1'. During filtration, the filtrate flows off through the openings 6, 7 into the tubes 23, in the process building up a filter cake on the exterior of the filter element. From there it is collected by means of the hollow space 26 in the central tube 25 and removed from the filter element via the opening 15. The flow direction is reversed for back-flushing, because of the fluid flowing out of the filter element, the filter fabric is expanded and is loosened from the outside surface 24 of the filter element. In the course of this movement the filter cake is cast off the outside surface of the filter element.

I claim:

1. A multiple tube filter, comprising a hose-shaped filtering fabric; at least one perforated filter element supporting said filtering fabric so that said filtering fabric surrounds said filter element and a liquid to be filtered flows from outside through said filtering fabric and then through said filter element into an interior of said filter element, said filter element having an outer surface provided with a plurality of spirally circulating grooves so that a profile of said outer surface is arched outwards to form a segment of a circle between two neighboring ones of said grooves in an imaginary plane extending perpendicular to said grooves, said outer surface of said filter element being constituted by a partial surface of at least one spirally formed tube; a center shaft formed as a linear central tube; and a cap arranged at lower ends of said spirally formed tube and said linear central tube and having a widened cup-shaped hollow space in which said spirally formed tube and said linear central tube terminate.

2. A multiple tube filter as defined in claim 1, wherein said outer surface of said filter element is formed by a partial surface of a plurality of such spirally formed tubes, said tubes being combined in the bundle of tubes.

3. A multiple tube filter as defined in claim 1, wherein said tubes of said bundle have a same diameter.

4. A multiple tube filter as defined in claim 1, wherein said filter element is provided with a plurality of ribs on its outer surface.

* * * * *